US012619561B2

(12) United States Patent
Wang

(10) Patent No.: US 12,619,561 B2
(45) Date of Patent: May 5, 2026

(54) DATA STORAGE SYSTEM INCLUDING INTERFACE DEVICE

(71) Applicant: SK hynix Inc., Icheon-si (KR)

(72) Inventor: Wenwei Wang, San Jose, CA (US)

(73) Assignee: SK HYNIX INC., Icheon-si (KR)

( * ) Notice: Subject to any disclaimer, the term of this patent is extended or adjusted under 35 U.S.C. 154(b) by 19 days.

(21) Appl. No.: 18/617,540

(22) Filed: Mar. 26, 2024

(65) Prior Publication Data

US 2025/0307183 A1 Oct. 2, 2025

(51) Int. Cl.
 *G06F 5/00* (2006.01)
 *G06F 13/16* (2006.01)
(52) U.S. Cl.
 CPC ................................. *G06F 13/1684* (2013.01)
(58) Field of Classification Search
 None
 See application file for complete search history.

(56) References Cited

U.S. PATENT DOCUMENTS 7,174,411 B1 * 2/2007 Ngai ................... G06F 13/4022
 710/316
11,531,634 B2 12/2022 Olarig et al.

2014/0314417 A1 * 10/2014 Leigh ...................... H04L 41/12
 398/154
2022/0050800 A1 * 2/2022 Kim .................... G06F 13/4022
2023/0418507 A1 12/2023 Mane et al.
2024/0394201 A1 * 11/2024 Sutardja .............. G06F 12/0811
2025/0055810 A1 * 2/2025 Shrikhande ........... H04L 49/111

* cited by examiner

*Primary Examiner* — Henry Tsai
*Assistant Examiner* — Dean Phan
(74) *Attorney, Agent, or Firm* — Perkins Coie LLP

(57) ABSTRACT

Data storage systems are disclosed. In some implementations, a data storage device includes a controller coupled to a plurality of memory devices to control memory operations of the plurality of memory devices, and including M communication lanes, and an interface device configured to include N communication lanes to be connected to a host device that includes N communication lanes and to the M communication lanes of the controller, wherein the interface device includes a connector configured to connect the N communication lanes of the host device to the N communication lanes of the interface device, and a selector configured to, in response to a host port type identification signal received from the host device, selectively activate M communication lanes of the interface device, out of the N communication lanes of the interface device, to transmit or receive the data to or from the M communication lanes of the controller.

20 Claims, 5 Drawing Sheets

Memory System

110

| 102 | 104 | 106 | 108 |
|---|---|---|---|

Memory Area

Memory Unit (e.g., block, page)

Memory Unit

⋮

Memory Unit

Memory Area

Memory Unit (e.g., block, page)

Memory Unit

⋮

Memory Unit

Memory Area

Memory Unit (e.g., block, page)

Memory Unit

⋮

Memory Unit

. . .

Memory Area

Memory Unit (e.g., block, page)

Memory Unit

⋮

Memory Unit

120

121 — Memory Interface (e.g., NAND memory interface)

122 — System Memory

123 — Buffer/Cache

124 — Processor

125 — ECC Engine

126 — Host Interface (e.g., SATA, PATA, SD, USB, PCLe)

*FIG. 1*

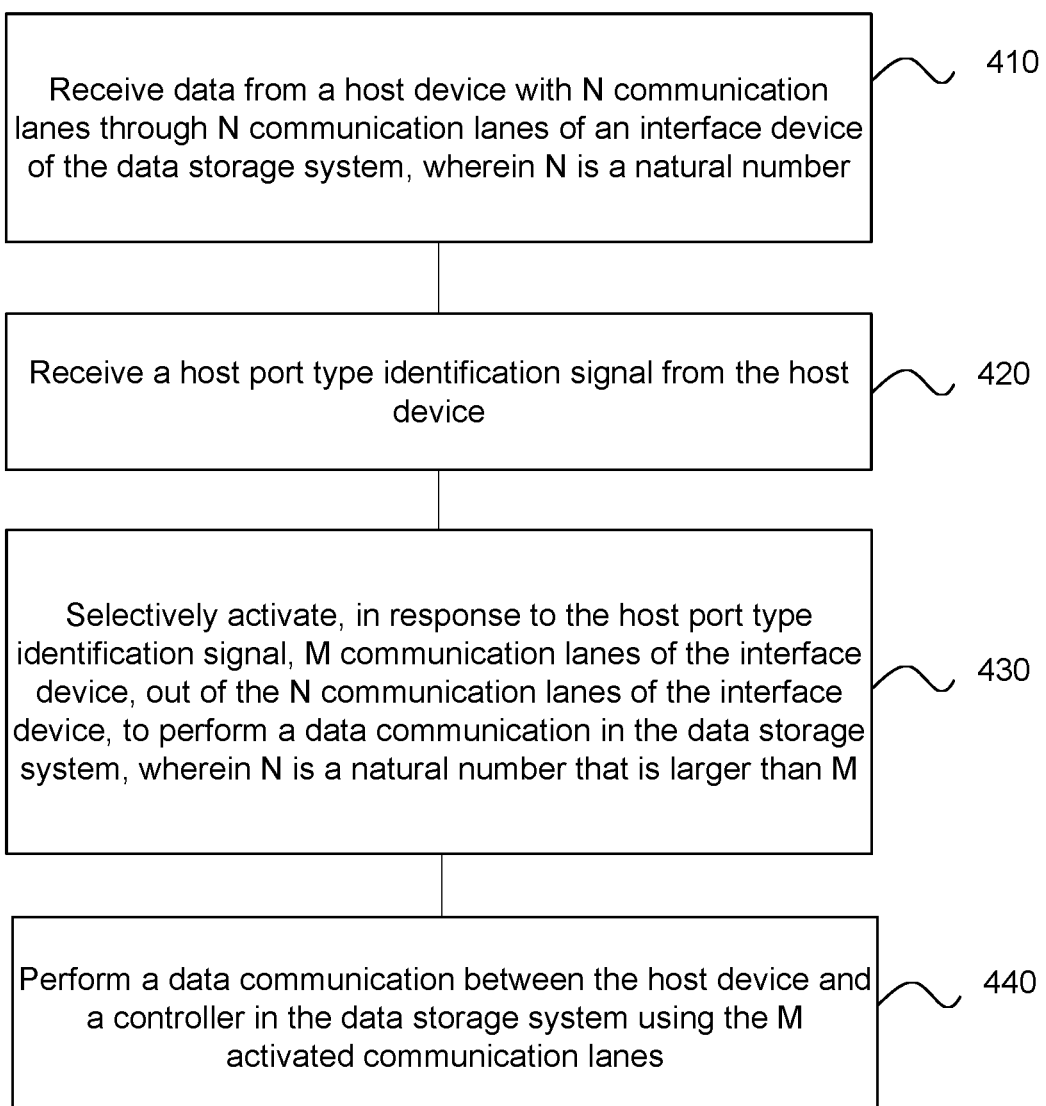

400

Receive data from a host device with N communication lanes through N communication lanes of an interface device of the data storage system, wherein N is a natural number    410

Receive a host port type identification signal from the host device    420

Selectively activate, in response to the host port type identification signal, M communication lanes of the interface device, out of the N communication lanes of the interface device, to perform a data communication in the data storage system, wherein N is a natural number that is larger than M    430

Perform a data communication between the host device and a controller in the data storage system using the M activated communication lanes    440

*FIG. 4*

DATA STORAGE SYSTEM INCLUDING INTERFACE DEVICE

TECHNICAL FIELD

This patent document relates to interface devices for data storage systems.

BACKGROUND

Data storage systems such as hard disk drives (HDDs) or solid-state drives (SSDs) are computer components or electronic systems that store data, such as the operating system, applications, and user files. Data storage systems may have different types of interfaces, which define how data is transferred between a data storage system and other devices such as host devices.

SUMMARY

The disclosed technology can be implemented in some embodiments to connect a data storage system with PCIe lanes of a port type that is different from the PCIe lane port type of a host device by using switch circuits and switch algorithms.

In some embodiments of the disclosed technology, a data storage system may include a controller coupled to a plurality of memory devices to control memory operations of the plurality of memory devices, and including M communication lanes, and an interface device configured to include N communication lanes to be connected to a host device that includes N communication lanes and to the M communication lanes of the controller, wherein the interface device includes a connector configured to connect the N communication lanes of the host device to the N communication lanes of the interface device, and a selector configured to, in response to a host port type identification signal received from the host device, selectively activate M communication lanes of the interface device, out of the N communication lanes of the interface device, to transmit or receive the data to or from the M communication lanes of the controller.

In some embodiments of the disclosed technology, a method of operating a data storage system may include receiving data from a host device with N communication lanes through N communication lanes of the data storage system, wherein N is a natural number, receiving a host port type identification signal from the host device, activating, in response to the host port type identification signal, M communication lanes of the data storage system, out of the N communication lanes of the data storage system, to perform a data communication in the data storage system, wherein N is a natural number that is larger than M, and performing a data communication between the host device and a controller in the data storage system using the M activated communication lanes.

In some embodiments of the disclosed technology, a data storage system may include a memory device including a plurality of memory areas configured to store data, a controller coupled to the memory device and including M communication lanes, wherein M is a natural number, and an interface device including N communication lanes and configured to carry out a method, comprising receiving data from a host device with N communication lanes through the N communication lanes of the interface device, wherein N is a natural number that is larger than M, receiving a host port type identification signal from the host device, activating, in response to the host port type identification signal, M communication lanes of the interface device, out of the N communication lanes of the interface device, to perform a data communication in the data storage system, and performing a data communication between the host device and a controller in the data storage system using the M activated communication lanes.

BRIEF DESCRIPTION OF THE DRAWINGS

FIG. 1 illustrates an example of a memory system that can be utilized for implementing some embodiments of the disclosed technology.

FIG. 4 is a flow diagram that illustrates an example interface algorithm based on some embodiments of the disclosed technology.

DETAILED DESCRIPTION

Figure 2:
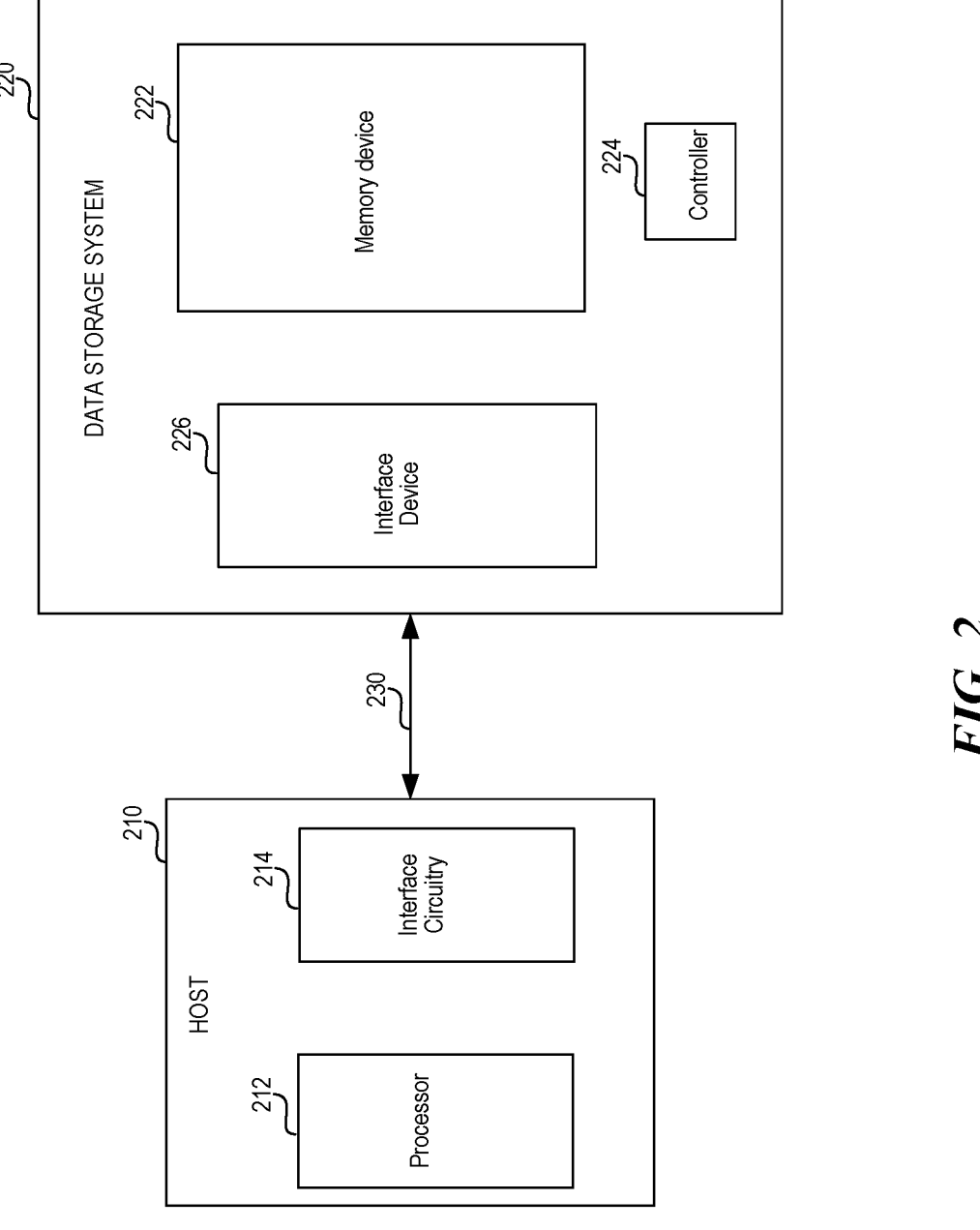
FIG. 2 illustrates an example configuration of a host system and a data storage system in communication with the host system that can be used to implement some embodiments of the disclosed technology.

An interface is a standard that defines how data is transferred between storage devices and other devise such as a host device. Among others, PCIe (Peripheral Component Interconnect Express) interface is a high-speed interface standard that connects various internal components in a computer system. Data storage system such as solid state drives (SSDs) have been widely adopting PCIe interface to communicate with the host. In an example where PCIe includes four lanes of PCIe interfaces that are used to transmit and receive data, two types of physical connections, U.2 and U.3, may be used. Both the U.2 and U.3 may use the same two PCIe lanes commonly, but each of the U.2 and U.3 may have two dedicated PCIe lanes. As a result, U.2 and U.3 compatible SSDs require the use of six PCIe lanes of the system on chip (SoC) controller, which adds design complexity to the SoC controller development and also increases the SoC controller cost.

PCIE hosts may have a host port type such as U.2 or U.3, and U.2 and U.3 compatible SSDs may be connected to PCIE hosts and operate through an automatic detection between a host and an SSD drive via a device identification (ID) and a host port type ID.

The U.3 interface was added to the PCIe interface standard after the U.2 interface, and thus the previous SoC controllers use four PCIe lanes of U.2 and cannot be used by the PCIE U.2 and U.3 compatible SSDs requiring six PCIe lanes.

The disclosed technology can be implemented in some embodiments to provide a printed circuit board (PCB)-level architecture and design method for the PCIE U.2 and U.3 compatible SSDs using only the four PCIE lane of SoC, which simplifies the next-generation SoC design and saves the overall SSDs development time. In addition, the disclosed technology can be implemented in some embodiments to use the previously developed SoC with four PCIE lanes of U.2 for the PCIE U.2 and U.3 compatible SSDs.

FIG. 1 illustrates an example of a memory system 100 that can be utilized for implementing some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, or 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a bank, block, or page that can be identified by a unique address such as bank address, block address, and page basis address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 111 can be configured to store at least one bit of information (e.g., one bit of information or multiple bits of information), and each of the memory cells in memory area 112 can be configured to store more than one bit of information.

As shown in FIG. 1, the memory system 100 includes a controller module 120. The controller module 120 includes a memory interface 121 to communicate with the memory module 110, a host interface 126 with communicate with a host (not shown), a processor 124 to executes firmware-level code, and buffers/caches and memories 122 and 123 to temporarily or persistently store executable firmware/instructions and associated information. In some implementations, the controller unit 120 can include an error correction engine 125 to perform error correction operation on information stored in the memory module 110. Error correction engine 122 can be configured to detect/correct single bit error or multiple bit errors. In another implementation, error correction engine 125 can be located in the memory module 110.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

The controller module 120 may include an error correction code (ECC) engine 125 that is configured to receive data to be written to the plurality of memory areas 102, 104, 106, 108 and to generate a codeword. For example, the ECC engine 125 may include an encoder configured to encode data using error correction codes such as a low-density parity check (LDPC) encoder.

The ECC engine 125 may also be configured to receive data and to process the received data using the error correction codes such as the LDPC decoder. The LDPC decoder may be configured to decode data read from the plurality of memory areas 102, 104, 106, 108 to detect and correct, up to an error correction capability of the ECC scheme, one or more bits of errors that are present in the data.

FIG. 2 illustrates an example configuration of a host 210 and a data storage system 220 in communication with the host 210 that can be used to implement some embodiments of the disclosed technology.

The host 210 can be a device or a system that includes one or more processors 212 that operate to retrieve data from the data storage system 220 or store or write data into the data storage system 220. In some implementations, examples of the host can include a personal computer (PC), a portable digital device, a digital camera, a digital multimedia player, a television, and a wireless communication device. In some implementations, the host 210 may include interface circuitry 214 to communicate with the data storage system 220 through a communication lane 230.

The data storage system 220 includes a memory device 220 that can be used to store information for use by the host 210. In some implementations, the data storage system 220 may include the memory system 100 that includes the memory areas 102, 104, 106, 108 illustrated in FIG. 1. In some implementations, the memory areas 102, 104, 106, 108 may include a memory cell array that includes NAND flash memory array that is partitioned into many blocks, and each block contains a certain number of pages. Each block includes a plurality of memory cell strings, and each memory cell string includes a plurality of memory cells.

Some examples of the data storage system 220 include a solid-state drive (SSD), which is a data storage device that utilizes non-volatile memories (e.g., flash memory) and/or volatile memories (e.g., synchronous dynamic random access memory; SDRAM) to store data. For example, the data storage system 220 may include a plurality of flash memory devices using multi-level cell technology. Each memory device includes a plurality of memory blocks, and each of the plurality of memory block includes a plurality of memory cells. Each memory cell can be programmed into one of a plurality of program states. The data stored in each memory cell can be read out using a plurality of read thresholds.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

In some implementations, the data storage system 220 may also include an interface device 226 configured to provide a communication between the data storage system 220 and the host 210. In one example, the data storage system 220 may include the host interface 126 illustrated in FIG. 1. In some implementations, the data storage system 220 may also include a controller 224 that is used to control operations of the memory device 222 and/or the interface device 226. In one example, the controller 224 may include any type of controller or processor that can provide the functions described herein.

As discussed above, a certain SoC controller using four PCIe lanes of U.2 cannot be used by the PCIe U.2 and U.3 compatible SSDs requiring six PCIe lanes. The disclosed technology can be implemented in some embodiments to address these issues by providing a PCB-level design to implement U.2 and U.3 compatible SSDs using four PCIe lanes of SoC controller.

Figure 3A:
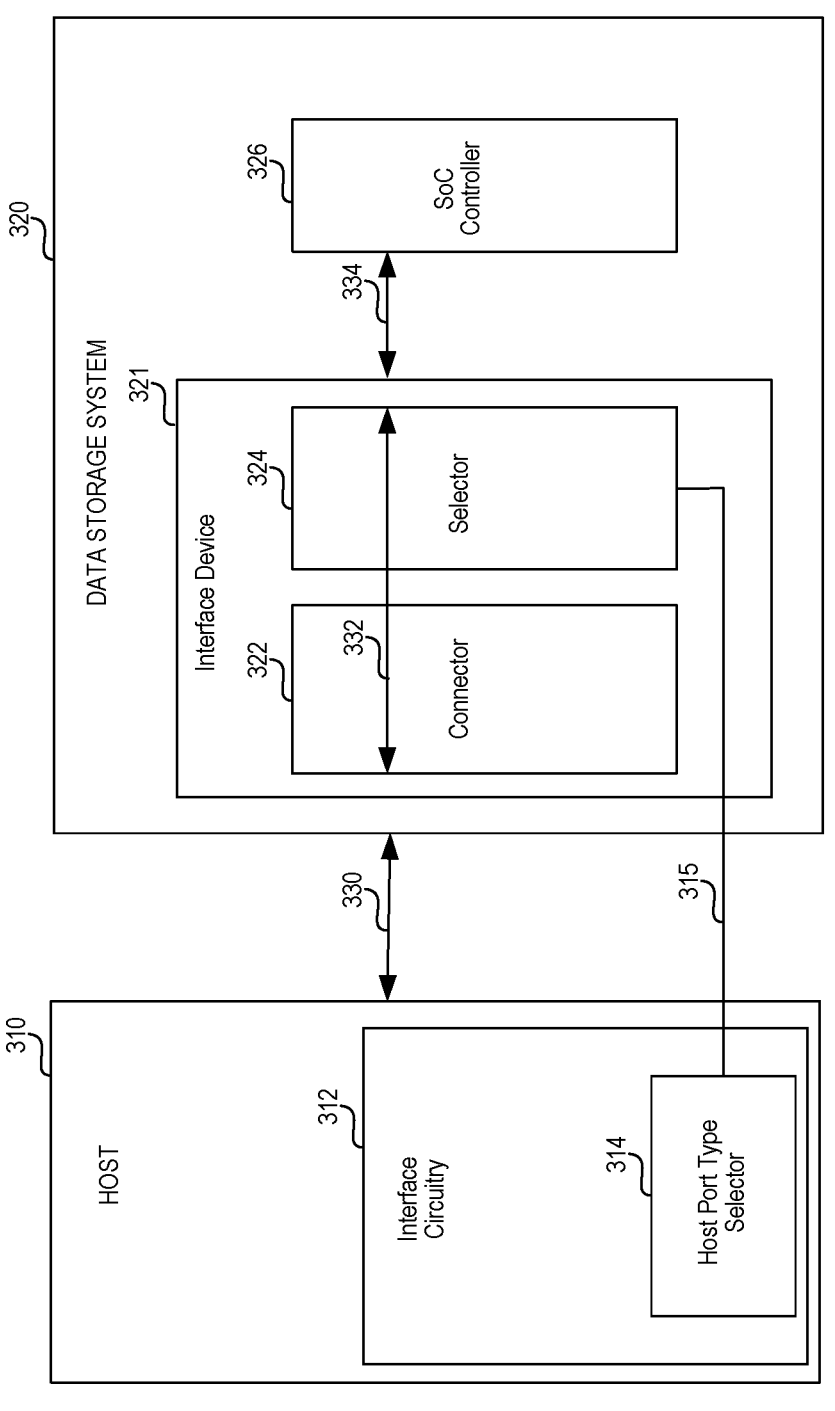
FIG. 3A illustrates an example configuration of a host and a data storage system that includes an interface device based on some embodiments of the disclosed technology.
Figure 3B:
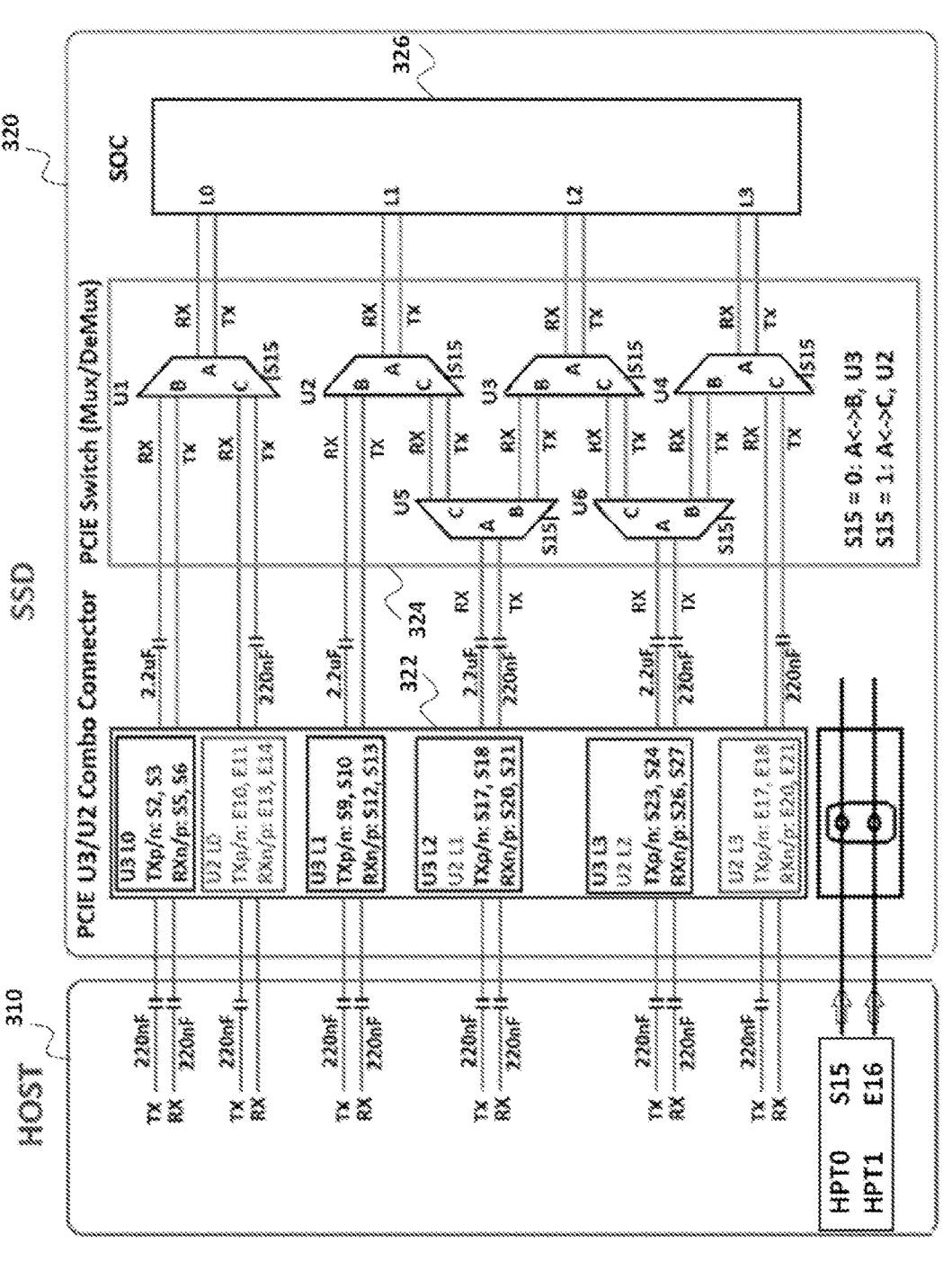
FIG. 3B illustrates another example configuration of a host and a data storage system that includes a PCIe U3/U2 combination connector, a PCIe switch, and a controller.

FIG. 3A illustrates an example configuration of a host 310 and a data storage system 320 that includes an interface device 321 based on some embodiments of the disclosed technology. In some embodiments, the interface device 321 may include a connector (e.g., PCIe U3/U2 combination connector) 322, a selector (e.g., PCIe switch) 324, and a system on chip (SoC) controller 326 including a plurality of PCIe lanes based on some embodiments of the disclosed technology. FIG. 3B illustrates another example configuration of a host 310 and a data storage system 320 that includes a PCIe U3/U2 combination connector (PCIe U3/U2 combo connector) 322, a PCIe switch 324, and a controller 326.

As shown in FIG. 3A, the host 310 may include interface circuitry 312 including a host port type selector 314. In some implementations, the host port type selector 314 is coupled to or in communication with the data storage system 320 to select one of a plurality of types of physical connections such that the data storage system 320 can transmit data and signals according to the selected physical connection type. For example, the host 310 with N PCIe lanes can be connected to the data storage system 320 that includes the SoC 326 with M PCIe lanes using an interface device 330 that includes N PCIe lanes and activates M PCIe lanes out of the N PCIe lanes of the data storage system 320 in response to the selected physical connection type. In one example, N and M are natural numbers and N is larger than M. In some implementations, the interface device 330 selectively activates PCIe lanes in response to the selected physical connection type. For example, the interface device 330 selectively activates M PCIe lanes out of the N PCIe lanes of the data storage system 320, and deactivates N-M PCIe lanes in response to the selected physical connection type (e.g., host port type identification signal).

In some embodiments of the disclosed technology, the interface device 31 may include a connector 322 configured to connect communication lanes 330 (e.g., N PCIe lanes) from the host 310 to a selector 324 configured to selectively activate M PCIe lanes of the interface device 31 out of N PCIe lanes 332 to perform a communication between the host 310 configured to include N PCIe lanes and the SoC 326 configured to include M PCIe lanes 334, in response to a host port type identification signal 315 from the host port type selector 316.

In some implementations, one of two port types, U.2 and U.3, may be used for a host and a data storage system that includes a PCIe interface that uses a certain number of lanes to transmit and receive data between the host and an SoC controller in the data storage system. In some implementations, both the U.2 and U.3 may use the same two PCIe lanes commonly, but each of the U.2 and U.3 may have two dedicated PCIe lanes. In some embodiments of the disclosed technology, as shown in FIG. 3B, at the PCB design level, a plurality of PCIe switches 324 can be used to activate four PCIe lanes out of six lanes of a PCIe connector 322, which interfaces between a host (PCIe host) 310 and the data storage device 320, to transmit or receive data to or from an SoC (system on chip) controller 326 that includes four PCIe lanes. In this way, a host that operates on either U.2 or U.3 can be connected to a data storage system that includes an SoC controller that include a smaller number of PCIe lanes compared to the host.

In some embodiments of the disclosed technology, the data storage system (e.g., SSD) 320 may include a PCIe connector (e.g., PCIe U3/U2 combination connector) 322 to connect communication lanes of the data storage system to communication lanes of the host 310. In some embodiments, as shown in FIG. 3B, the PCIe U3/U2 combination connector 322 may include six PCIe lanes, and each lane includes a pair of a transmitter differential signal line TXp/n and a receiver differential signal line RXp/n.

In FIG. 3B, the terms "U3 L0," "U3 L1," "U3 L2," and "U3 L3" indicate lane 0, lane 1, lane 2, and lane 3 of U.3 port type, respectively, and the terms "U2 L0," "U2 L1," "U2 L2," and "U2 L3" indicate lane 0, lane 1, lane 2, and lane 3 of U.2 port type, respectively. The term "TXp/n: S2, S3" indicates PCIe differential signals TXp and TXn transmitted to connector physical pins S2 and S3, respectively, and the term "RXn/p: S5, S6" indicates PCIe differential signals RXn and RXp transmitted to connector physical pins S5 and S6, respectively. The term "TXp/n: E10, E11" indicates PCIe differential signals TXp and TXn transmitted to connector physical pins E10 and E11, respectively, and the term "RXnp: E13, E14" indicates PCIe differential signals RXn and RXp transmitted to connector physical pins E13 and E14, respectively. The term "TXp/n: S9, S10" indicates PCIe differential signals TXp and TXn transmitted to connector physical pins S9 and S10, respectively, and the term "RXn/p: S12, S13" indicates PCIe differential signals RXn and RXp transmitted to connector physical pins S12 and S13, respectively. The term "TXp/n: S17, S18" indicates PCIe differential signals TXp and TXn transmitted to connector physical pins S17 and S18, respectively, and the term "RXn/p: S20, S21" indicates PCIe differential signals RXn and RXp transmitted to connector physical pins S20 and S21, respectively. The term "TXp/n: S23, S24" indicates PCIe differential signals TXp and TXn transmitted to connector physical pins S23 and S24, respectively, and the term "RXn/p: S26, S27" indicates PCIe differential signals RXn and RXp transmitted to connector physical pins S26 and S27, respectively. The term "TXp/n: E17, E18" indicates PCIe differential signals TXp and TXn transmitted to connector physical pins E17 and E18, respectively, and the term "RXnp: E20, E21" indicates PCIe differential signals RXn and RXp transmitted to connector physical pins E20 and E21, respectively.

In some embodiments of the disclosed technology, U.3 port uses four lanes and U.2 port uses four lanes, and U.2 port and U.3 port share one or more lanes.

In some implementations, the U.3 port uses four lanes: U3 L0, U3 L1, U3 L2, U3 L3, and the U.2 port uses four lanes: U2 L0, U2 L1, U2 L2, U2 L3, and U2 L1 and U3 L2 are the same shared lane, and U2 L2 and U3 L3 are the same shared lane. In some implementations, U2 L0, U2 L3, U3 L0, and U3 L1 are dedicated lanes.

In some embodiments of the disclosed technology, as shown in FIG. 3B, the host 310 includes a total of six PCIe lanes, and operates using either U.2 port or U.3 port at a time.

In some embodiments of the disclosed technology, the host 310 outputs one or more host port type ID signals to connect to a particular PCIe connector physical pin. In one example, the host 310 outputs first and second host port type ID signals HPT0 and HPT1 to connect to the PCIe connector physical pin S15 and E16, respectively. In some implementations, when the first host port type ID signal HPT0 is "open" or at a logic high level ("1"), it can be determined that the host 310 is a U.2 host, and when the host port type ID signal HPT0 is "ground" or at a logic low level ("0"), it can be determined that the host 310 is a U.3 host. In some implementations, when the second host port type ID signal HPT1 is "open" or at a logic high level ("1"), it can be determined that the host interface is a PCIe interface.

In some embodiments of the disclosed technology, the SoC 326 may be an SSD SoC controller that includes four PCIe lanes. In some implementations, all of the four PCIe lanes are always active.

In some embodiments of the disclosed technology, referring to FIG. 3A, the connector 322 and the selector may include N PCIe lanes that are connected to N PCIe lanes of the host 310, and the selector 324 may activate, in response to the host port type identification signal 315, M PCIe lanes out of its N PCIe lanes to communicate with M PCIe lanes of the SoC 326. In one example, as shown in FIG. 3B, the PCIe switch 324 may be used to connect the four PCIe lanes of SoC to either U.2 port or U.3 port of the host 310 in response to the HPT0 signal from the host 310 by activating four PCIe lanes out of the six PCIe lanes.

In some embodiments of the disclosed technology, the PCIe switch 224 may include one or more switch circuits such as multiplexers and demultiplexers. Referring to FIG. 3B, the PCIe switch 224 may include one or more multiplexers and one or more demultiplexers. In some implementations, when the HPT0 signal is at a logic low level ("0"), selection pins of the one or more multiplexers and the one or more demultiplexers in the PCIe switch 224 are at a logic low level ("0"), and the PCIe switch 224 connects the four PCIe lanes of SoC to U.3 port of the host 310. When the PCIe switch 224 connects the four PCIe lanes of SoC to U.3 port of the host 310, transmission signals (TX) and reception signals (RX) move between "A" pin and "B" pin. In some implementations, when the HPT0 signal is at a logic high level ("1"), selection pins of the one or more multiplexers and the one or more demultiplexers in the PCIe switch 224 are at a logic high level ("1"), and the PCIe switch 224 connects the four PCIe lanes of SoC to U.2 port of the host 310. When the PCIe switch 224 connects the four PCIe lanes of SoC to U.2 port of the host 310, transmission signals (TX) and reception signals (RX) move between "A" pin and "C" pin.

In some embodiments of the disclosed technology, as shown in FIG. 3B, the PCIe connector 322 may include: one or more common PCIe lanes (e.g., U3L2/U2L1, U3L3/U2/L2) connected to an input port of the one or more demultiplexers in the PCIe switch 224; and one or more dedicated PCIe lanes (e.g., U3L0, U3L1 dedicated to U3 port type, U2L0, U2L3 dedicated to U2 port type) connected to an input port of the one or more multiplexers in the PCIe switch 224.

In some embodiments of the disclosed technology, the PCIe switch 224 may include one or more switch circuits that are cascaded. For example, the PCIe switch 224 may include a first switch circuit column and a second switch circuit column connected to the first switch circuit column such that input terminals of the first switch circuit column are coupled to PCIe lanes of the host 310, output terminals of the first switch circuit column are coupled to input terminals of the second switch circuit column, and output terminals of the second switch circuit column are coupled to PCIe lanes of SoC. In some implementations, the first switch circuit column and the second switch circuit column are activated in response to a same selection signal such as the HPT0 signal from the host 310. In this way, N PCIe lanes of host 310 can communicate with M PCIe lanes of the SoC 326 through N PCIe lanes of the interface device by activating M PCIe lanes out of N PCIe lanes of the interface device.

Table 1 shows an example of the assignment of the PCIe combination connector pins based on SFF-TA-1001 Specification for Universal x4 Link Definition for SFF-8639, and the PCIe lanes assignment between SoC lanes and Host lanes for U.2 and U.3.

TABLE 1

PCIE Combination Connector Pins Assignment

| S15 (HPT0) | SoC L0 | SoC L1 | SoC L2 | SoC L3 |
|---|---|---|---|---|
| '0' for U.3 | L0 (S2, S3) (S5, S6) | L1 (S9, S10) (S12, S13) | L2 (S17, S18) (S20, S21) | L3 (S23, S24) (S26, S27) |
| '1' for U.2 | L0 (E10, E11) (E13, E14) | L1 (S17, S18) (S20, S21) | L2 (S23, S24) (S26, S27) | L3 (E17, E18) (E20, E21) |

As shown in Table 1, each PCIe lane can be logically related or mapped to an SoC lane and a Host Port Type ID signal S15. For example, U3.L0 corresponds to/S15·SoC.L0, U2.L0 corresponds to S15·SoC.L0, U3.L1 corresponds to/S15·SoC.L1, [U3.L2, U2.L1] corresponds to/S15·SoC.L2+S15·SoC.L1, [U3.L3, U2.L2] corresponds to/S15·SoC.L3+S15·SoC.L2, and U2.L3 corresponds to S15·SoC.L3.

In some embodiments of the disclosed technology, the PCIe switch 324 may be configured to realize the above logical relationships. As shown in FIG. 3B, the PCIe switch 324 may include a plurality of switches, for example, four multiplexers U1, U2, U3, U4 and two demultiplexers U5, U6 that are controlled by the HPT (Host Port Type) signal S15. When S15 is "0," A terminal and B terminal of all switches (all multiplexers and demultiplexers) are in an "on" state to select U.3 port of the host 310. When S15 is "1," A terminal and C terminal of all switches (all multiplexers and demultiplexers) are in an "on" state to select U.2 port of the host 310. In this way, the four lanes of SoC can be automatically connected to the U.3 port or U.2 port based on the (HPT) Host Port Type signal.

The disclosed technology can be implemented in some embodiments to provide a PCB level solution for the U.3 and U.2 compatible SSDs design by activating part of PCIe lanes of the interface device to communicate with an SoC controller that includes a smaller number of PCIe lanes than the host.

FIG. 4 is a flow diagram that illustrates a set of example operations for implementing a PCIe switching method based on some embodiments of the disclosed technology.

The method 400 includes, at 410, receiving data from a host device with N communication lanes through N communication lanes of an interface device of the data storage system, wherein N is a natural number, at 420, receiving a host port type identification signal from the host device, at 430, activating, in response to the host port type identification signal, M communication lanes of the interface device, out of the N communication lanes of the interface device, to perform a data communication in the data storage system, wherein N is a natural number that is larger than M, at 440, performing a data communication between the host device and a controller in the data storage system using the M activated communication lanes.

Therefore, various implementations of features of the disclosed technology can be made based on the above disclosure, including the examples listed below.

Example 1.

A data storage system comprising: a controller coupled to a plurality of memory devices to control memory operations of the plurality of memory devices, and including M communication lanes, wherein M is a natural number; and an interface device configured to include N communication lanes to be connected to a host device that includes N communication lanes and to the M communication lanes of the controller, wherein N is a natural number that is larger than M, wherein the interface device includes: a connector configured to connect the N communication lanes of the host device to the N communication lanes of the interface device; and a selector configured to, in response to a host port type identification signal received from the host device, activate M communication lanes of the interface device, out of the N communication lanes of the interface device, to transmit or receive the data to or from the M communication lanes of the controller.

Example 2.

The system of example 1, wherein the selector includes one or more second switch circuits configured to receive inputs from the connector and one or more first switch circuits configured to receive inputs from at least one of the connector or the one or more second switch circuits, wherein output terminals of the one or more second switch circuits and input terminals of the one or more first switch circuits are selected in response to the host port type identification signal received from the host device.

Example 3.

The system of example 2, wherein the one or more first switch circuits include a multiplexer, and the one or more second switch circuits include a demultiplexer.

Example 4.

The system of example 2, wherein the connector includes: one or more shared input terminals connectable to one or more shared lanes used by a plurality of host port types; and one or more dedicated input terminals connectable to one or more dedicated lanes used by a specific host port type of the plurality of host port types, wherein input terminals of the one or more second switch circuits are configured to receive inputs from the one or more shared lanes and input terminals of the one or more first switch circuits are configured to receive inputs from at least one of the one or more shared lanes or the one or more dedicated lanes.

Example 5.

The system of example 4, wherein the one or more second switch circuits configured to receive the inputs from the one or more shared lanes include a demultiplexer, and the one or more first switch circuits configured to receive the inputs from at least one of the one or more shared lanes or the one or more dedicated lanes include a multiplexer.

Example 6.

The system of example 2, wherein the one or more first switch circuits include first to fourth multiplexers, and the one or more second switch circuits include first and second demultiplexers.

Example 7.

The system of example 6, wherein the first and second demultiplexers are configured to receive inputs from the connector, the first multiplexer is configured to receive inputs from the connector, the second multiplexer is configured to receive inputs from the connector and the first demultiplexer, the third multiplexer is configured to receive inputs from the first and second demultiplexers, and the fourth multiplexer is configured to receive inputs from the connector and the second demultiplexer.

Example 8.

The system of example 7, wherein output terminals of the one or more demultiplexers and input terminals of the one or more multiplexers are selected in response to a host port type identification signal received from the host device.

Example 9.

The system of example 7, wherein the connector includes: first and second shared input terminals connectable to first and second shared lanes used by a plurality of host port types; and first to fourth dedicated input terminals connectable to first to fourth dedicated lanes used by a specific host port type of the plurality of host port types.

Example 10.

The system of example 9, wherein input terminals of the first and second demultiplexers are configured to receive inputs from the first and second shared lanes and input terminals of the first to fourth multiplexers are configured to receive inputs from at least one of the first and second shared lanes or the first to fourth dedicated lanes.

Example 11.

A method of operating a data storage system, the method comprising: receiving data from a host device with N communication lanes through N communication lanes of an interface device of the data storage system, wherein N is a natural number; receiving a host port type identification signal from the host device; selectively activating, in response to the host port type identification signal, M communication lanes of the interface device, out of the N communication lanes of the interface device, to perform a data communication in the data storage system, wherein N is a natural number that is larger than M, and performing a data communication between the host device and a controller in the data storage system using the M activated communication lanes.

Example 12.

The method of example 11, wherein activating the M communication lanes of interface device out of the N communication lanes of the interface device includes activating one of first and second input terminals of a first switch circuit in response to the host port type identification signal, wherein the first input terminal of the first switch circuit is coupled to a first dedicated lane dedicated to a first host port type and the second input terminal of the first switch circuit is coupled to a second dedicated lane dedicated to a second host port type.

Example 13.

The method of example 11, wherein activating the M communication lanes of the interface device out of the N communication lanes of the interface device includes activating one of first and second output terminals of a second switch circuit in response to the host port type identification signal, wherein an input terminal of the second switch circuit is coupled to a shared lane shared by first and second port types.

Example 14.

The method of example 13, wherein activating the M communication lanes of the interface device out of the N communication lanes of the interface device further includes activating one of first and second input terminals of a first switch circuit in response to the host port type identification signal, wherein the one of first and second input terminals is coupled to the activated one of the first and second output terminals of the second switch circuit.

Example 15.

The method of example 11, wherein activating the M communication lanes of the interface device out of the N communication lanes of the interface device includes selecting one of a plurality of input terminals of a first switch circuit and selecting one of a plurality of output terminals of a second switch circuit.

Example 16.

A data storage system, comprising: a memory device including a plurality of memory areas configured to store data; a controller coupled to the memory device and including M communication lanes, wherein M is a natural number; and an interface device including N communication lanes and configured to carry out a method, comprising: receiving data from a host device with N communication lanes through the N communication lanes of the interface device, wherein N is a natural number that is larger than M; receiving a host port type identification signal from the host device; activating, in response to the host port type identification signal, M communication lanes of the interface device, out of the N communication lanes of the interface device, to perform a data communication in the data storage system, and performing a data communication between the host device and a controller in the data storage system using the M activated communication lanes.

Example 17.

The system of example 16, wherein activating the M communication lanes of the interface device out of the N communication lanes of the interface device includes activating one of first and second input terminals of a first switch circuit in response to the host port type identification signal, wherein the first input terminal of the first switch circuit is coupled to a first dedicated lane dedicated to a first host port type and the second input terminal of the first switch circuit is coupled to a second dedicated lane dedicated to a second host port type.

Example 18.

The system of example 16, wherein activating the M communication lanes of the interface device out of the N communication lanes of the interface device includes activating one of first and second output terminals of a second switch circuit in response to the host port type identification signal, wherein an input terminal of the second switch circuit is coupled to a shared lane shared by first and second port types.

Example 19.

The system of example 18, wherein activating the M communication lanes of the interface device out of the N communication lanes of the interface device further includes activating one of first and second input terminals of a first switch circuit in response to the host port type identification signal, wherein the one of first and second input terminals is coupled to the activated one of the first and second output terminals of the second switch circuit.

Example 20.

The system of example 16, wherein activating the M communication lanes of the interface device out of the N communication lanes of the interface device includes selecting one of a plurality of input terminals of a first switch circuit and selecting one of a plurality of output terminals of a second switch circuit.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a," "an" and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A data storage system comprising:
a controller coupled to a plurality of memory devices to control memory operations of the plurality of memory devices, and including M communication lanes, wherein M is a natural number; and
an interface device configured to include N communication lanes to be connected to a host device that includes N communication lanes and to the M communication lanes of the controller, wherein N is a natural number that is larger than M, wherein the interface device includes:
a connector configured to connect the N communication lanes of the host device to the N communication lanes of the interface device; and
a selector configured to, in response to a host port type identification signal received from the host device, selectively activate M communication lanes of the interface device, out of the N communication lanes of the interface device, to transmit or receive the data to or from the M communication lanes of the controller,
wherein the connector includes one or more shared input terminals connectable to one or more shared lanes used by a plurality of host port types, and one or more dedicated input terminals connectable to one or more dedicated lanes used by a specific host port type of the plurality of host port types.

2. The system of claim 1, wherein the selector includes one or more second switch circuits configured to receive inputs from the connector and one or more first switch circuits configured to receive inputs from at least one of the connector or the one or more second switch circuits, wherein output terminals of the one or more second switch circuits and input terminals of the one or more first switch circuits are selected in response to the host port type identification signal received from the host device.

3. The system of claim 2, wherein the one or more first switch circuits include a multiplexer, and the one or more second switch circuits include a demultiplexer.

4. The system of claim 2, wherein input terminals of the one or more second switch circuits are configured to receive inputs from the one or more shared lanes and input terminals of the one or more first switch circuits are configured to receive inputs from at least one of the one or more shared lanes or the one or more dedicated lanes.

5. The system of claim 4, wherein the one or more second switch circuits configured to receive the inputs from the one or more shared lanes include a demultiplexer, and the one or more first switch circuits configured to receive the inputs from at least one of the one or more shared lanes or the one or more dedicated lanes include a multiplexer.

6. The system of claim 2, wherein the one or more first switch circuits include first to fourth multiplexers, and the one or more second switch circuits include first and second demultiplexers.

7. The system of claim 6, wherein the first and second demultiplexers are configured to receive inputs from the connector, the first multiplexer is configured to receive inputs from the connector, the second multiplexer is configured to receive inputs from the connector and the first demultiplexer, the third multiplexer is configured to receive inputs from the first and second demultiplexers, and the fourth multiplexer is configured to receive inputs from the connector and the second demultiplexer.

8. The system of claim 7, wherein output terminals of the one or more demultiplexers and input terminals of the one or more multiplexers are selected in response to a host port type identification signal received from the host device.

9. The system of claim 7, wherein the one or more shared input terminals include first and second shared input terminals, and the one or more dedicated input terminals include first to fourth dedicated input terminals, the first and second shared input terminals connectable to the first and second shared lanes used by the plurality of host port types, and the first to fourth dedicated input terminals connectable to the first to fourth dedicated lanes used by the specific host port type of the plurality of host port types.

10. The system of claim 9, wherein input terminals of the first and second demultiplexers are configured to receive inputs from the first and second shared lanes and input terminals of the first to fourth multiplexers are configured to receive inputs from at least one of the first and second shared lanes or the first to fourth dedicated lanes.

11. A method of operating a data storage system, the method comprising:

receiving data from a host device with N communication lanes through N communication lanes of an interface device of the data storage system, wherein N is a natural number;

receiving a host port type identification signal from the host device;

selectively activating, in response to the host port type identification signal, M communication lanes of the interface device, out of the N communication lanes of the interface device, to perform a data communication in the data storage system, wherein N is a natural number that is larger than M; and performing a data communication between the host device and a controller in the data storage system using the M activated communication lanes, wherein the interface device includes a connector that includes one or more shared input terminals connectable to one or more shared lanes used by a plurality of host port types, and one or more dedicated input terminals connectable to one or more dedicated lanes used by a specific host port type of the plurality of host port types.

12. The method of claim 11, wherein activating the M communication lanes of interface device out of the N communication lanes of the interface device includes activating one of first and second input terminals of a first switch circuit in response to the host port type identification signal, wherein the first input terminal of the first switch circuit is coupled to a first dedicated lane dedicated to a first host port type and the second input terminal of the first switch circuit is coupled to a second dedicated lane dedicated to a second host port type.

13. The method of claim 11, wherein activating the M communication lanes of the interface device out of the N communication lanes of the interface device includes activating one of first and second output terminals of a second switch circuit in response to the host port type identification signal, wherein an input terminal of the second switch circuit is coupled to a shared lane shared by first and second port types.

14. The method of claim 13, wherein activating the M communication lanes of the interface device out of the N communication lanes of the interface device further includes activating one of first and second input terminals of a first switch circuit in response to the host port type identification signal, wherein the one of first and second input terminals is coupled to the activated one of the first and second output terminals of the second switch circuit.

15. The method of claim 11, wherein activating the M communication lanes of the interface device out of the N communication lanes of the interface device includes selecting one of a plurality of input terminals of a first switch circuit and selecting one of a plurality of output terminals of a second switch circuit.

16. A data storage system, comprising:

a memory device including a plurality of memory areas configured to store data;

a controller coupled to the memory device and including M communication lanes, wherein M is a natural number; and an interface device including N communication lanes and configured to carry out a method, comprising:

receiving data from a host device with N communication lanes through the N communication lanes of the interface device, wherein N is a natural number that is larger than M;

receiving a host port type identification signal from the host device;

activating, in response to the host port type identification signal, M communication lanes of the interface device, out of the N communication lanes of the interface device, to perform a data communication in the data storage system; and performing a data communication between the host device and a controller in the data storage system using the M activated communication lanes, wherein the interface device includes a connector that includes one or more shared input terminals connectable to one or more shared lanes used by a plurality of host port types, and one or more dedicated input terminals connectable to one or more dedicated lanes used by a specific host port type of the plurality of host port types.

17. The system of claim 16, wherein activating the M communication lanes of the interface device out of the N communication lanes of the interface device includes activating one of first and second input terminals of a first switch circuit in response to the host port type identification signal, wherein the first input terminal of the first switch circuit is coupled to a first dedicated lane dedicated to a first host port type and the second input terminal of the first switch circuit is coupled to a second dedicated lane dedicated to a second host port type.

18. The system of claim 16, wherein activating the M communication lanes of the interface device out of the N communication lanes of the interface device includes activating one of first and second output terminals of a second switch circuit in response to the host port type identification signal, wherein an input terminal of the second switch circuit is coupled to a shared lane shared by first and second port types.

19. The system of claim 18, wherein activating the M communication lanes of the interface device out of the N communication lanes of the interface device further includes activating one of first and second input terminals of a first switch circuit in response to the host port type identification signal, wherein the one of first and second input terminals is coupled to the activated one of the first and second output terminals of the second switch circuit.

20. The system of claim 16, wherein activating the M communication lanes of the interface device out of the N communication lanes of the interface device includes selecting one of a plurality of input terminals of a first switch circuit and selecting one of a plurality of output terminals of a second switch circuit.

\* \* \* \* \*